United States Patent [19]

Zinke et al.

[11] 4,305,495

[45] Dec. 15, 1981

[54] VARIABLE LIFT CONVEYING APPARATUS

[75] Inventors: Eugene H. Zinke; Giacomo R. Zambon, both of Warren, Mich.

[73] Assignee: Hooker Chemicals & Plastics Corp., Warren, Mich.

[21] Appl. No.: 26,455

[22] Filed: Apr. 2, 1979

[51] Int. Cl.³ .......................................... B65G 49/02
[52] U.S. Cl. .................................................. 198/342
[58] Field of Search ..................... 198/342; 134/76, 77

[56] References Cited

U.S. PATENT DOCUMENTS

| 1,233,109 | 7/1917 | Nesbit | 134/77 |
| 3,009,467 | 11/1961 | Jackson | 134/77 |
| 3,612,243 | 10/1971 | McAllister | 198/342 |
| 3,760,927 | 9/1973 | Zambon | 198/342 |

Primary Examiner—Robert B. Reeves
Assistant Examiner—Brian Bond

Attorney, Agent, or Firm—Harness, Dickey & Pierce

[57] ABSTRACT

A conveying machine for transporting work pieces through a series of work stations including a plurality of work carriers disposed at spaced intervals on a framework and intermittently movable therealong from one station to the next adjacent station. Each work carrier incorporates a vertically movable carriage thereon from which the work pieces are suspended and the carriage is selectively positionable at a fully raised position, a fully lowered position and at least one intermediate position therebetween to provide for a desired treating sequence at one or more treating stations. Each carriage is vertically movable independently of the other carriages and control means are provided for coordinating the transfer movement of the work carriers and the vertical positioning of each carriage at a treating station at the desired elevated position in accordance with a preselected operating sequence.

9 Claims, 6 Drawing Figures

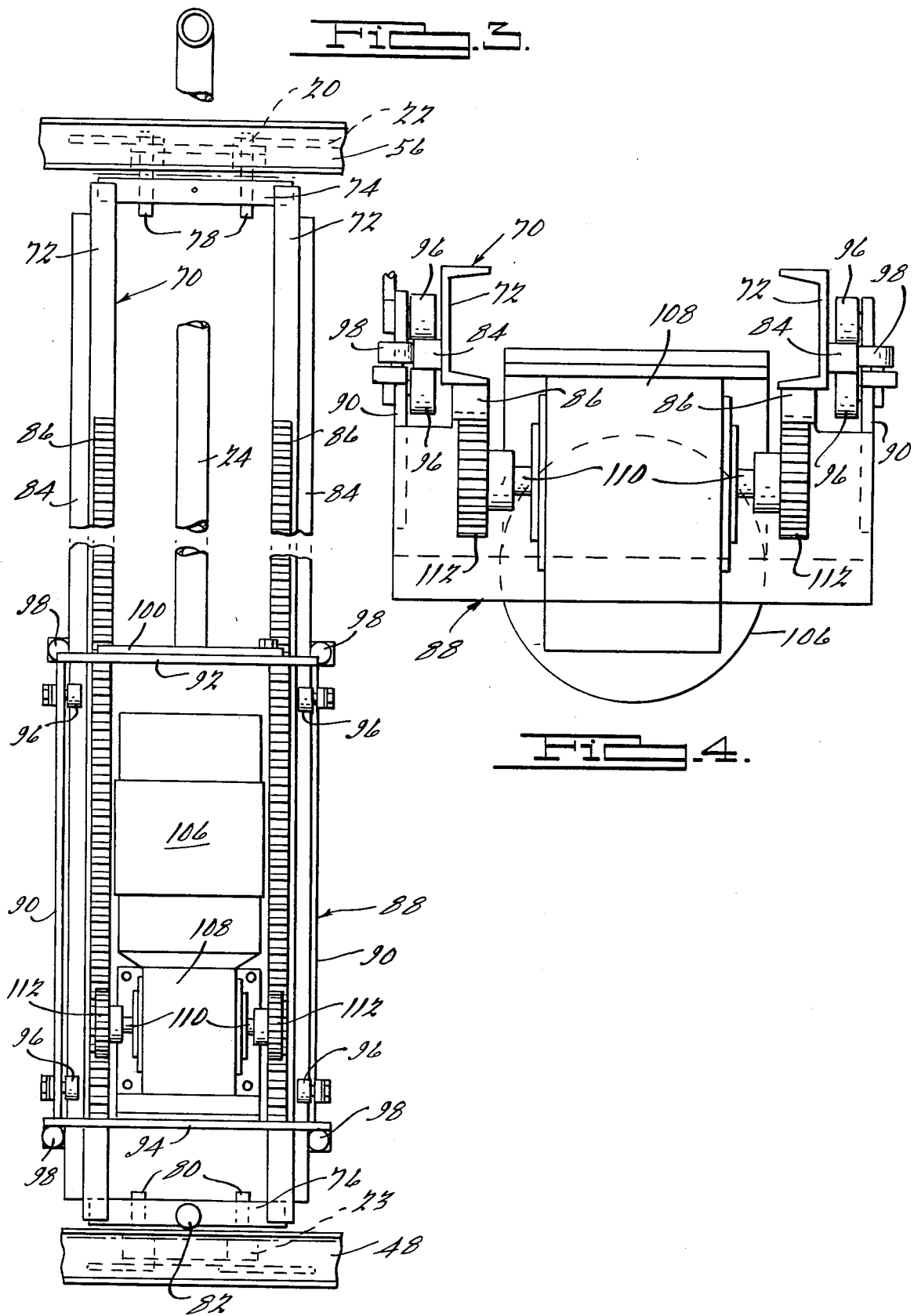

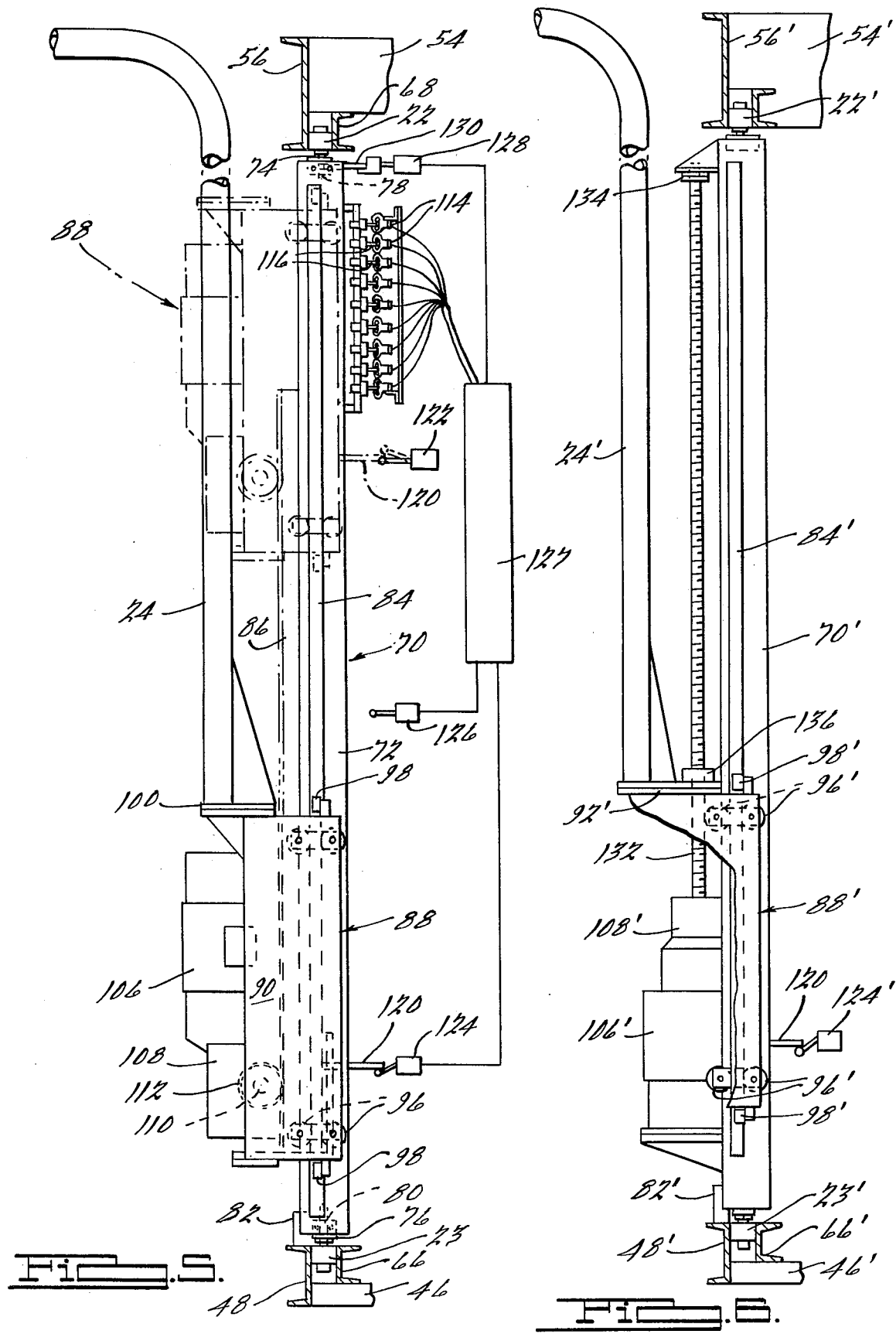

VARIABLE LIFT CONVEYING APPARATUS

BACKGROUND OF THE INVENTION

The present invention broadly relates to conveying machines of the general type for automatically conveying work pieces through a preselected treating cycle. More particularly, the present invention is directed to an automatic conveying machine of the so-called side arm type incorporating a plurality of work carriers including a vertically movable carriage on which a laterally extending supporting arm is affixed to which one or a plurality of work pieces are suspended and are conveyed thereby through successive treating stations in an ordered preselected sequence.

Arm-type conveying machines of the aforementioned type are generally disclosed in U.S. Pat. Nos. 2,945,579; 3,311,214; 3,331,518; 3,504,812; 3,674,127; 3,760,927 and 3,770,150. Conveying apparatuses of the type disclosed in the aforementioned patents are particularly applicable for conveying workpieces or work racks incorporating work pieces thereon through a sequential chemical, electrochemical, electroplating, and the like process in which the work pieces are subjected to a prescribed treatment at each of a plurality of treating stations. The work pieces are adapted to be lowered into appropriate treating fluids at a treating station and are periodically elevated in order that they can be transferred over the partitions separating adjacent treating stations.

The innovation of new treating processes and techniques frequently requires the work pieces to be positioned at an intermediate elevation between the fully raised and fully lowered position. Additionally, variations in the treatment cycle to which selected work pieces are to be subjected further requires a provision for a delayed dip or early pick-up operation as well as a skip operation at certain treating stations to vary the time of treatment of such selected work pieces at such stations. Various mechanisms have heretofore been used or proposed for effecting variations in the treatment time of work pieces at selected work stations which have not been entirely satisfactory for one or a number of reasons. More particularly, arm-type conveying machines of the types heretofore known have not been adaptable for positioning the work supporting arm at one or a plurality of intermediate positions between the fully raised and fully lowered positions. Accordingly, the capability of computerized control systems to provide for sophisticated treating sequences in accordance with the latest technology have not been fully realized in prior art machines.

The conveying apparatus of the present invention comprises an improvement over prior art conveying machines of similar type substantially enhancing the flexibility and versatility of feasible treating cycles to which the work pieces can be subjected.

SUMMARY OF THE INVENTION

The benefits and advantages of the present invention are achieved by an improved conveying machine incorporating guide means on a framework which extends longitudinally along a series of treating stations. A plurality of work carriers each incorporating an upright carriage frame which is mounted for movement along the guide means movably supports a carriage having a work supporting arm thereon. Each work carrier incorporates motor means drivingly connected through coacting drive means between the carriage and frame for moving the carriage and work supporting arm thereon between a raised position, a fully lowered position and at least one intermediate position therebetween. Transfer means are provided for intermittently advancing the work carriers from one station to the next adjacent treating station at which power supply means are located and are adapted to be connected to each work carrier for supplying power to the motor means thereon when at that station. Sensing means are included for sensing the vertical position of each carriage and control means are operatively associated with the transfer mechanism and the power supply means for selectively energizing the motor means to provide a desired vertical positioning and movement of each carriage between the several vertically spaced positions in accordance with a preselected operating sequence.

In accordance with a preferred embodiment of the present invention, the framework and guide means define a closed circuit along which the plurality of work carriers are intermittently advanced and a vertical movement and positioning of the carriage and work supporting arm thereon is achieved by a rack and pinion arrangement drivingly connected to a reversible electric motor incorporating a brake therein. Sensing means in the form of limit switches or the like are positioned at each treating station and are actuatable by an actuator on the carriage for signaling the control circuit of the vertical disposition of the carriage on each work carrier.

Additional benefits and advantages of the present invention will become apparent upon a reading of the description of the preferred embodiments taken in conjunction with the accompanying drawings.

BRIEF DESCRIPTION OF THE DRAWINGS

FIG. 3 is a fragmentary magnified front elevational view of a work carrier;

FIG. 4 is a magnified fragmentary plan view of the work carrier shown in FIG. 3;

FIG. 5 is a fragmentary side elevational view of the work carrier shown in FIG. 3; and FIG. 6 is a fragmentary side elevational view of a work carrier incorporating a carriage in accordance with an alternative embodiment of the present invention.

DESCRIPTION OF THE PREFERRED EMBODIMENTS

Figure 1:
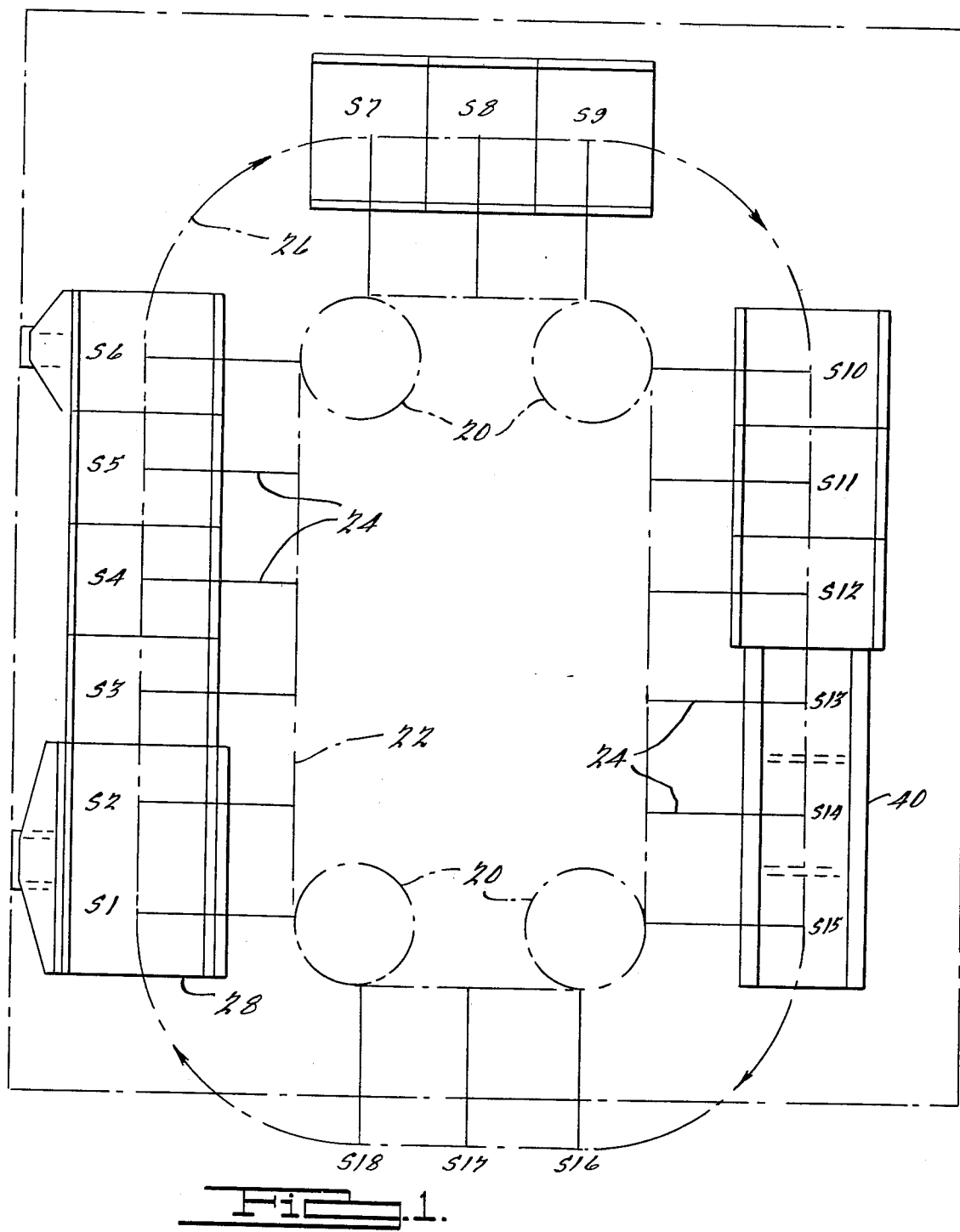
FIG. 1 is a schematic plan view of a typical arrangement of treating stations and the relative disposition of an arm-type machine of the present invention.

Referring now in detail to the drawings and as may be best seen in FIG. 1, a typical machine and processing arrangement is illustrated of the so-called return-type in which the work stations are arranged in a closed loop pattern and the work supporting arms are moved sequentially through the treating stations in a clockwise direction as viewed in FIG. 1. It will be appreciated that the principles and construction of the present invention are also applicable for machines of the so-called straight line or straight-through type in which the work pieces are loaded at one end and are unloaded at the opposite end thereof. In the specific arrangement illustrated in FIG. 1, eighteen treating stations are provided, indicated at S1 through S18 for providing a cleaning, rinsing, and chemical drying process sequence on metallic work pieces. The conveying machine as shown in phantom comprises four rotary sprockets 20, mounted in each corner thereof along which a flexible element such as a roller chain 22 is trained. Work carriers (not shown) are connected at substantially equal longitudinally spaced intervals to the roller chain 22 and include a laterally extending work supporting arm 24 to the end of which work pieces are adapted to be suspended at a position in substantial alignment with the closed path of travel of the work pieces as indicated by the dashed line 26.

The first two stations are defined by a multiple station treating tank 28 having two adjacent stations, S1 and S2, in which a preliminary cleaning treatment of the work pieces is performed. Upon elevation and transfer from the second station of the cleaning tank 28, the work pieces are subjected to a deionized water immersion rinse at station S3, followed by a deionized water spray rinse at station S4. The work pieces are again immersed in a deionized water immersion rinse at station S5 whereafter a further cleaning operation is performed thereon at station S6. A deionized immersion rinse, deionized water spray rinse and a further cleaning step are performed at stations S7–S9, respectively. Further deionized spray, immersion and spray water rinsing is performed sequentially at stations S10–S12, respectively, whereafter the work pieces are advanced into stations S13–S15 in which a chemical drying is performed in a manner more fully described hereafter. The cleaned and dried work pieces are unloaded and fresh work pieces are reloaded on the work supporting arms at the multiple load-unload stations S16–S18.

Figure 2:
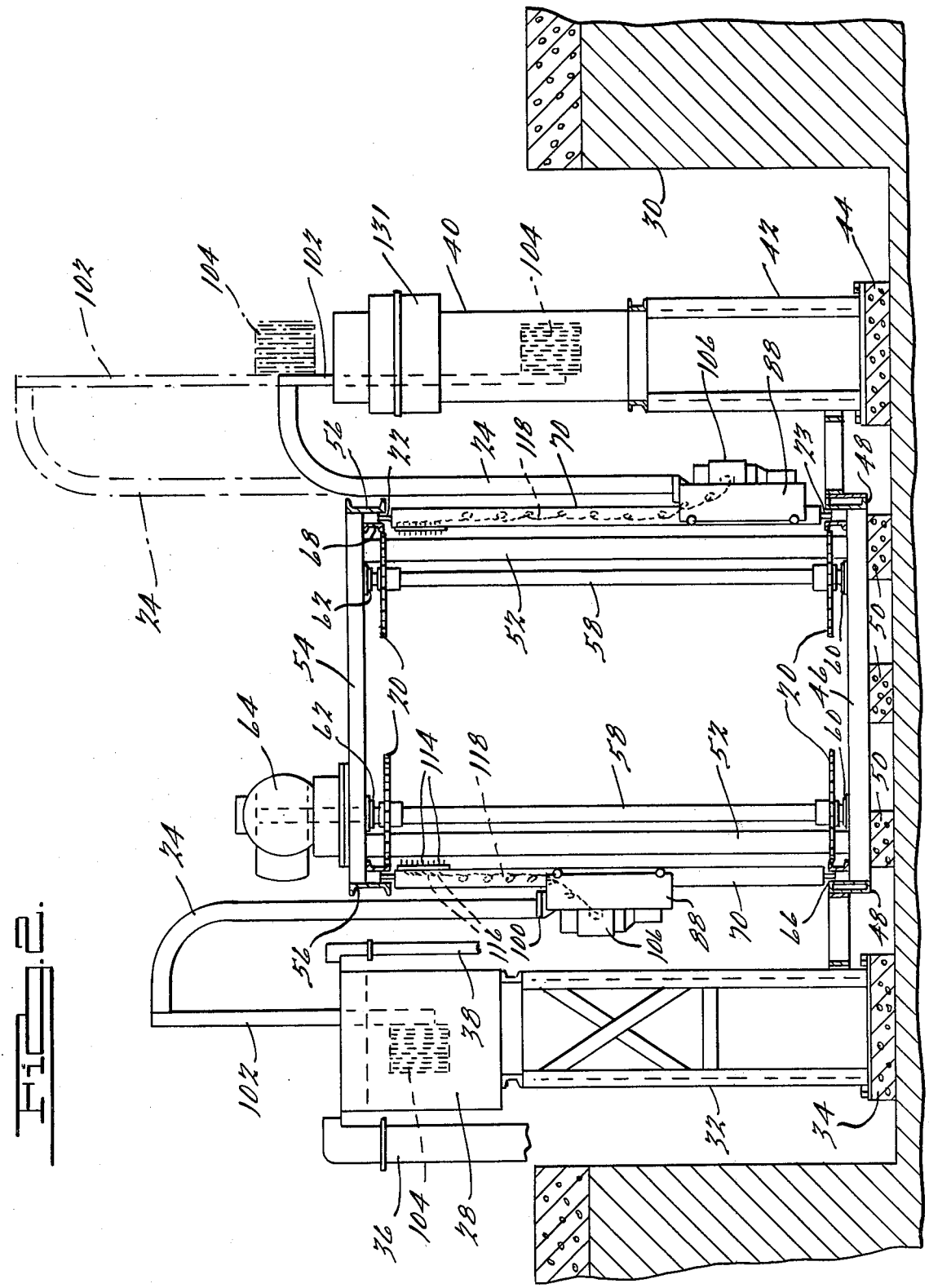
FIG. 2 is an end elevational view partly in section of the conveying machine and treating receptacles shown in FIG. 1.

Referring now in detail to FIG. 2, the disposition of the conveying machine relative to the various treating receptacles is such that all rubbing and moving parts of the machine are disposed below the upper edges of the treating receptacles to avoid contamination providing for an ultraclean processing cycle. For this purpose, the machine is positioned within a pit 30 to provide for satisfactory overhead clearance of the work supporting arms and work pieces when in the fully raised position. The individual treating receptacles such as the dual station treating tank 28 is supported at substantially floor level by means of a I-beam framework 32 having its base supported on a suitable concrete footing 34. The treating tank 28 is provided with vent ducts 36, 38 for withdrawing any contaminating vapors adjacent to the upper edge of the tank.

Similarly, a chemical drying receptacle 40 defining stations S13–S15 is supported on an I-beam framework 42 mounted on a concrete pad 44 within the pit 30.

The conveying machine comprises a three dimensional box-shaped framework including a base comprised of transverse base beams 46 and longitudinally extending side beams 48 supported within the pit by means of concrete pads 50. A series of vertical columns 52 extend upwardly from the base and are connected at their upper ends to transverse beams 54 to the ends of which longitudinally extending side channel beams 56 are rigidly secured defining therebetween an elevated platform. A sprocket assembly is rotatably mounted in each corner of the box-shaped framework, each including a vertically mounted shaft 58 rotatably supported by a base bearing 60 affixed to the upper surface of the base beams 46 and an upper bearing 62 affixed to the underside of the transverse beams 54. An upper and lower sprocket 20 as previously indicated in phantom in FIG. 1 is affixed to each shaft 58 and the roller chain 22 is trained in a continuous manner around the four upper sprockets and while a roller chain 23 is trained around the four lower sprockets defining a closed loop. A drive motor assembly 64 is mounted on the elevated platform of the framework coaxial with one of the shafts 58 for intermittently rotating the shaft and sprocket thereon effecting an intermittent advancement of the roller chain and the work carriers connected thereto from one station to the next adjacent treating station. The remaining three sprocket assemblies serve as idlers for guiding the advancing movement of the roller chain.

The roller chains 22, 23 as best seen in FIGS. 3 and 5 are guidably disposed between opposed surfaces defining a guide track for guidably moving the work carriers during their transfer movement and for maintaining the work carriers in appropriate position at a treating station. The lower roller chain 23 is positioned between the inner surfaces of the beam 48 and a channel beam 66 mounted on the upper surfaces of the base beam 46 such that its opposed surface is disposed in inwardly spaced substantially parallel relationship to the beam 48. The upper roller chain 22 similarly is disposed in guided relationship between the side channel beam 56 and an upper channel beam 68, affixed to the underside of the transverse beams 54 such that its opposed face surface is positioned in inwardly spaced substantially parallel relationship to the side channel beam. Guidance of the roller chains around the arcuate corner portions of the framework is performed by the sprockets 20.

Each work carrier as best seen in FIGS. 2–5 is comprised of a substantially upright rectangular carriage frame 70 comprised of a pair of opposed channel side members 72 secured at their upper end by an upper cross member 74 and at their lower end by a lower cross member 76. The upper cross member 74 is secured by means of a pair of pins 78 to the roller chain 22 and which also serve to interconnect the respective rollers and links defining the roller chain. Similarly, a pair of pins 80 connect the lower cross member 76 of the carriage frame to the lower roller chain 23. A support roller 82 as best seen in FIGS. 3 and 5 is rotatably supported at substantially the center of the lower cross member 76 and is disposed in rolling supported engagement on the upper surface of the longitudinal beams 48 which extend in a continuous manner around the arcuate corner portions of the machine and the straight end sections defining thereby a continuous support track.

A rectangular rail 84 is affixed to the outer face of the web of each of the side members 72 of the carriage frame and extends for substantially the entire length of the carriage frame. A straight gear rack 86 is affixed to the forward face of the flange of each side member 72 of the carriage frame as shown in FIGS. 3–5. A vertically movable carriage assembly 88 is mounted on each carriage frame 70 and includes a rectangular frame comprised of a pair of spaced side members 90, an upper cross member 92 and a lower cross member 94. Four pairs of guide rollers 96 are affixed to the side members of the carriage frame and are disposed in rolling bearing contact against opposite side surfaces of each of the rails 84. A side guide roller 98 is also secured to each corner of the carriage frame and is disposed in rolling bearing contact against the outer face of the rail 84 as best seen in FIG. 4. Accordingly, the carriage assembly is guidably restrained for vertical movement along the rails 84 of each work carrier.

A tubular L-shaped work supporting arm 24 is affixed by means of a base bracket 100 to the upper cross member 92 of each carriage and extends therefrom in a vertical and lateral direction to a position above the various treating receptacles and stations. As best seen in FIG. 2, a vertical arm 102 is affixed to the projecting end of the supporting arm and to the lower end of which a plurality of work pieces 104 such as discs are supported. The vertical supporting arm 102 is preferably removably attached to the supporting arm to enable replacement with alternative configurations to best adapt the apparatus to different work pieces or work racks being processed.

Movement of the carriage 88 from a fully lowered position as shown in solid lines on the right hand side as viewed in FIG. 2 and a fully raised position as shown in phantom, as well as to an intermediate position as shown in solid lines in the left hand side of FIG. 2 is achieved by individual drive means on each carriage drivingly coupled through coacting means to the carriage frame. As best seen in FIGS. 3-5, the carriage drive means comprises a reversible electric motor 106 incorporating a brake which is drivingly coupled through a single worm drive to a motor reducer 108 secured to the carriage frame. The motor reducer 108 incorporates a laterally extending shaft 110 to the ends of which pinion gears 112 are affixed and are disposed in constant meshing relationship with the respective rack 86 on the carriage frame 70.

Electric power is supplied to the reversable electric motor 106 of each carriage by means of a plurality of conductor rails 114 as best seen in FIG. 5 extending along the path of travel of the work carriers. The rails are of a segmented construction incorporating intervening insulated sections in order that each station can be individually controlled. In the specific arrangement illustrated, a total of nine conductor rails are provided at each station and a corresponding number of contact brushes 116 are mounted on each work carrier and are slidably disposed in electrical contact with the conductor rails. A flexible conductor 118 either of a coiled retractable type or an umbilical cable connects the contact brushes to the reversible motor 106.

In the exemplary embodiment illustrated, the upper three contact rails 114 provide for high speed rotation of the electric motor, the central three conductor rails provide for low speed operation while the lower three rails are employed to energize and retract the spring loaded brake mechanism of the drive motor system. The brake mechanism may be any of the types well known in the art and commercially available which are spring biased to an engaged or braking position so as to retain the carriage at the proper elevated position. The three brake conductor rails are simultaneously energized with the low or high speed conductor rails to effect a release of the brake mechanism enabling the electric motor to move the carriage in a vertical direction. Upon deenergization of the low or high speed conductor rails, the brake conductor rails are simultaneously deenergized enabling the spring action to mechanically engage the brake mechanism retaining the carriage at that position. The supply of electrical current to the low speed and high speed conductor rails is achieved through a remote switching mechanism which electrically connects each set of three rails at the proper polarity to provide the requisite direction of rotation of the reversible electric motor 106.

The remote switching device of each station is electrically connected to a control circuit incorporating a computerized control system (not shown) of any of the types well known in the art which is programmed such that the selected contact rails at each station are appropriately electrified to achieve the desired vertical movement and positioning of the work supporting arm and the work pieces thereon at the desired speed of travel relative to the respective treating station.

The vertical positioning of each carriage 88 and the work supporting arm carried thereby is achieved by a series of sensing devices mounted on the framework of the machine adjacent to each station employing suitable coacting means on each carriage. In accordance with the specific embodiment illustrated in FIG. 5, the coacting means on the carriage comprises a laterally extending actuator rod 120 extending inwardly toward the machine frame which is adapted to trip an up position carriage limit switch 122, a down position carriage limit switch 124 and one or more intermediate position carriage limit switches 126 which are mounted on the machine framework. Each of the limit switches is electrically connected to the central automatic control system schematically indicated at 127 and is selectively energized in accordance with the prescribed computerized program. A tripping of an energized limit switch by the actuator rod signals the control circuit which in turn deenergizes the conductor rails locking the brake mechanism and retaining the work carrier at that specified position.

The longitudinal disposition of the work carriers relative to the treating stations is also sensed by a station limit switch 128 secured to the upper portion of the machine frame as illustrated in FIG. 5 which is adapted to be tripped by an actuator rod 130 projecting inwardly from the upper carriage frame. The tripping of the station limit switch at the conclusion of the transfer movement of the work carriers signals the central control circuit which in turn deenergizes the drive motor assembly 64 (FIG. 2) and the rotation of the sprockets 20 and upper and lower roller chains drivingly coupled thereto.

In accordance with the foregoing structural features, it will be apparent that great flexibility and versatility in the processing cycle is provided consistent with the type of work pieces to be processed and the particular treating sequence to which they are to be subjected. Referring again to FIGS. 1 and 2, the arrangement as illustrated provides for a cleaning and chemical drying of the work pieces 104 during their transfer through stations S1-S15. Upon transfer from the load-unload stations S16-S18, the carriage and work supporting arm is moved to its fully elevated position in order that the work pieces 104 can pass in vertical clearance relationship above the partition of the two station treating tank 28 (FIG. 8). Upon attaining a position in alignment with station S1 as signaled by a tripping of station limit switch the motor 106 of the carriage is energized causing the work supporting arm and work pieces 104 thereon to move downwardly to an intermediate position as signaled by the tripping of an intermediate position carriage limit switch which deenergizes the motor 106 and applies the brake mechanism retaining the work pieces in the position as shown in the left hand side of FIG. 1. At the completion of a prescribed down dwell period as signaled by a suitable dwell timer incorporated in the central control circuit, the drive motor assembly 64 is energized effecting an advancement of the work carrier from a position in alignment with station S1 to a position in alignment with station S2 which is signaled by the tripping of station limit switch effecting a deenergization of the drive motor assembly 64. The down dwell timer is again activated and upon timing out the electric motor 106 on the carriage is energized to effect a movement of the work supporting arm and work pieces to a fully elevated position which is signaled by a tripping of up position carriage limit switch. Upon tripping of the up position limit switch, the central control circuit is signaled whereafter the transfer drive mechanism is again energized causing movement of the work carrier as well as the remaining carriers to the next adjacent station. In accordance with the foregoing, the work carrier and the work pieces thereon are sequentially transferred through stations S3 through S12.

At the completion of treatment in station S12 the work supporting arm and work pieces are elevated to the fully raised position and the work carrier is advanced to the first station S13 of a multiple station chemical drying receptacle 40 as indicated in FIGS. 1 and 2. In accordance with a typical chemical drying treatment, the work pieces are lowered from the fully raised position at slow speed from the fully raised position as shown in phantom in FIG. 2 through a vapor zone such as Freon vapors which are continuously condensed to avoid escape from the tank by means of a refrigeration coil section 131 disposed adjacent to the upper end thereof. The slow movement of the work pieces avoids disturbance of the vapors in this section. The work pieces thereafter continuously move downwardly through the vapor zone and finally into a boiling liquid Freon bath to attain a fully lowered position as indicated in FIG. 2. At the completion of the prescribed down dwell period, the carriage and work supporting arm is elevated to an intermediate position above the boiling liquid level and in the vapor zone whereafter they are transferred above the partition into the adjacent treating station S14. The operation is again repeated whereafter the work pieces are transferred to the third station S15. Upon withdrawl to the fully raised position from station S15, the work pieces are fully cleaned and dry and passed from there to the load-unload stations S16–S18.

It will be understood that the versatility provided by the individual control of each work carrier and the variable vertical positioning of the work supporting arm thereon is also applicable to a broad variety of alternative treating sequences including chemical, electro-chemical, electroplating, or the like.

Referring now to FIG. 6 of the drawings, an alternative satisfactory embodiment of a carriage lift mechanism is illustrated which provides for similar benefits and advantages. The work carrier and machine framework are essentially identical to that previously described in connection with FIGS. 1–5 and like parts are designated by the same numeral with a prime affixed thereto. As shown in FIG. 6, a reversible electric motor 106' is stationarily mounted on the base of the carriage frame 70' and includes an electrically deenergizable brake mechanism and motor reducer 108' having a vertical output shaft to which a vertically extending screw 132 is affixed. The upper end of the screw 132 is supported by a bearing 134 mounted at the upper end of the carriage frame. A ball nut 136 is affixed to an upper cross member 92' of the carriage 88' for effecting vertical movement of the carriage assembly and the work supporting arm 24' supported thereby. As in the case of the prior work carrier construction, the carriage 88' is guidably supported on the carriage frame 70' by means of side rails 84' with which guide rollers 96' and side guide rollers 98' are disposed in rolling bearing contact. The use of a screw and ball nut arrangement obviates a need for the rack and pinion mechanism as previously described and further removes the weight of the reversible motor, associated brake mechanism and gear reducer from the carriage permitting the use of a smaller motor, or in the alternative, providing for increased loading. In other respects, the control of the motor mechanism, the transfer of the work carriers, the elevating and lowering movement of the work carriage and supporting arm and the sensing of the position of the carriage are the same as that previously described.

It will be appreciated, that in lieu of the screw and ball nut lift arrangement as shown in FIG. 6 or the rack and pinion lift mechanism as illustrated in FIGS. 2–4, vertical movement of the carriage on the carriage frame can be achieved by a chain and sprocket lift mechanism or a cable and drum arrangement drivingly coupled to the reversible electric motor lift mechanism.

In addition to the cleaning process sequence as previously described in connection with FIG. 1, the apparatus of the present invention can also provide for a variable process sequence of work pieces including a delayed-dip operation, an early pick-up operation, and a skip operation at selected work stations. In accordance with a delayed-dip operation, a work carrier upon arriving at a treating station with the work supporting arm in the elevated position can be lowered a preselected time interval after the remaining carriages and work supporting arms are lowered. This is achieved by incorporating a suitable dwell timer in the central control circuit which commences timing when the work carriers arrive at a station and upon timing out, signals the central control circuit which energizes the conductor rails and the reversible electric motor connected thereto to effect a lowering of the carriage and work supporting arm thereby providing a shortened treating duration of those work pieces at that specific station.

Similarly, in accordance with an early pick-up operation, the reversible electric motor of a carriage at one or more specific treating stations is energized through a down dwell timer in the central control circuit causing the work supporting arm and work pieces supported thereby to be raised a preselected time interval before the main down dwell timer times out. In a skip operation, whereby selected ones of the work carriers and the work pieces supported thereby omit one or more treatments at selected work stations, the reversible motor is not energized upon arrival at a treating station retaining the work pieces in an elevated position above such station thereby skipping treatment. Additional variations and combinations of the foregoing sequences is feasible including multiple dipping at one or more stations to achieve a desired treatment of all or only selected ones of the work pieces on selected work carriers.

While it will be apparent that the invention herein disclosed is well calculated to achieve the benefits and advantages as hereinabove set forth, it will be appreciated that the invention is susceptible to modification, variation and change without departing from the spirit thereof.

What is claimed is:

1. A conveying machine comprising a framework, guide means extending longitudinally of said framework defining a closed path of travel along a series of treating stations, a plurality of work carriers each including an upright carriage mounted for movement along said guide means and a carriage having a work supporting arm thereon mounted for movement on said carriage frame, multiple speed reversible motor means stationarily mounted on each said carrier frame and drivingly connected to each said carriage for moving said carriage between a raised position, a lowered position and at least one intermediate position therebetween; transfer means comprising a flexible element extending along the path of travel of said work carriers and connected to each said carriage frame and power means for intermittently advancing said flexible element and said work carriers in unison from one treating station to the next adjacent treating station, power supply means comprising a plurality of conductor rails extending longitudinally of said guide means at at least some treating stations, said conductor rails at each said station selectively and independently energizable relative to said conductor rails at other stations to provide independent selective vertical movement at selective operating speeds of said work carrier at each such station, connecting means comprising contacts on each work carrier for electrically connecting said motor means to said conductor rails of said power supply means when at said stations, sensing means for sensing the position of each said carriage on said carriage frame, and control means for coordinating said transfer means and selectively energizing said power supply means and sensing means to provide a controlled intermittent advancement of said work carriers and a vertical movement and positioning of each said carriage at a treating station at the desired said raised, lowered and intermediate position in accordance with a preselected operating sequence.

2. The conveying machine as defined in claim 1 including an upper said flexible element connected to the upper portion of each said carriage frame and a lower said flexible element connected to the lower portion of each said carriage frame.

3. The conveying machine as defined in claim 1 in which each said carriage frame includes track means thereon for movably and guidably mounting said carriage thereon.

4. The conveying machine as defined in claim 1 in which said motor means on each said work carrier is drivingly connected to coacting drive means including a rack on said carriage frame and a pinion gear disposed in meshing relationship with said rack and drivingly coupled to said motor means.

5. The conveying machine as defined in claim 4 including a pair of said racks disposed in spaced substantially parallel relationship on each said carriage frame and a pair of said pinion gears disposed in meshing relationship with said rack and drivingly coupled to said motor means.

6. The conveying machine as defined in claim 1 in which said coacting drive means comprises a screw rotatably mounted on said carriage frame and drivingly coupled to said motor means, and means on said carriage operatively coupled to said screw for vertically moving said carriage in response to rotation of said screw.

7. The conveying machine as defined in claim 1 in which said sensing means comprises a plurality of sensing devices mounted in vertically spaced relationship on said framework at at least some of said treating stations and actuator means on each said carriage for cooperating with said sensing devices to signal the vertical position of said carriage at such stations.

8. The conveying machine as defined in claim 7 in which said sensing devices comprise limit switches.

9. The conveying machine as defined in claim 1 further including second sensing means on said framework for sensing the arrival of a work carrier at a treating station.

* * * * *